US012762629B2

(12) United States Patent
Hovakimyan et al.

(10) Patent No.: US 12,762,629 B2
(45) Date of Patent: Oct. 13, 2026

(54) METHODS AND SYSTEMS FOR INTELLIGENT AGRICULTURAL MANAGEMENT

(71) Applicant: The Board of Trustees of the University of Illinois, Urbana, IL (US)

(72) Inventors: Naira Hovakimyan, Champaign, IL (US); Pan Zhao, Deerfield, IL (US); Nicolas Martin, Champaign, IL (US); Ran Tao, Urbana, IL (US); Jing Wu, Savoy, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 69 days.

(21) Appl. No.: 18/611,438

(22) Filed: Mar. 20, 2024

(65) Prior Publication Data

US 2025/0299269 A1 Sep. 25, 2025

Related U.S. Application Data

(60) Provisional application No. 63/453,717, filed on Mar. 21, 2023.

(51) Int. Cl.
*G06Q 50/02* (2024.01)
*G06N 3/092* (2023.01)

(52) U.S. Cl.
CPC ............. *G06Q 50/02* (2013.01); *G06N 3/092* (2023.01)

(58) Field of Classification Search
CPC ............................... G06Q 50/02; G06N 3/092
See application file for complete search history.

(56) References Cited

U.S. PATENT DOCUMENTS

| | | | | |
|---|---|---|---|---|
| 11,704,581 | B1 | 7/2023 | Mcentire et al. | |
| 12,260,179 | B2 * | 3/2025 | Yuan | G06V 20/188 |
| 12,260,346 | B2 | 3/2025 | Casas et al. | |
| 2020/0126232 | A1 * | 4/2020 | Guo | G06T 7/0016 |
| 2022/0061236 | A1 | 3/2022 | Guan et al. | |
| 2024/0362723 | A1 * | 10/2024 | Bhambhani | G06Q 10/06312 |

FOREIGN PATENT DOCUMENTS

| | | | |
|---|---|---|---|
| AU | 2020100954 | A4 | 7/2020 |
| IN | 202141054863 | A | 12/2021 |

OTHER PUBLICATIONS

Tao, R., Zhao, P., Wu, J., Martin, N. F., Harrison, M. T., Ferreira, C., . . . & Hovakimyan, N. (2022). Optimizing crop management with reinforcement learning and imitation learning. arXiv preprint arXiv:2209.09991. (Year: 2022).*

(Continued)

*Primary Examiner* — Carrie S Gilkey
(74) *Attorney, Agent, or Firm* — McDonnell Boehnen Hulbert & Berghoff LLP

(57) ABSTRACT

Embodiments of the present disclosure may include a method for agricultural management, including receiving a trained first management policy that was trained with state information. Embodiments may also include training a second management policy using imitation learning. In some embodiments, the imitation learning uses the trained first management policy and partial state information in order to output action information, the partial state information being a portion of the state information.

18 Claims, 8 Drawing Sheets

(56) References Cited

OTHER PUBLICATIONS

Zhang et al., "Learning Deep Control Policies for Autonomous Aerial Vehicles with MPC-Guided Policy Search," IEEE International Conference on Robotics and Automation (ICRA), IEEE, 2016, pp. 528-535 (arXiv:1509.06791v2).
Zhang et al., "Short-Term Rainfall Forecasting Using Multi-Layer Perceptron," IEEE Transactions on Big Data, Jan.-Mar. 2020, pp. 93-106, vol. 6, No. 1.
Zhao et al., "A Simple crop model," European Journal of Agronomy, 2019, pp. 97-106, vol. 104.
Akkaya et al., Solving Rubik's Cube with a Robot Hand, arXiv preprint arXiv:1910.07113v1, Oct. 16, 2019, 51 pages.
Ara et al., "Application, adoption and opportunities for improving decision support systems in irrigated agriculture: A review," Agricultural Water Management, 2021, 16 pages, vol. 257, No. 107161.
Ashcraft et al., "Machine Learning aided Crop Yield Optimization, Association for the Advancement of Artificial Intelligence," arXiv:2111.00963V1, Nov. 1, 2021, 4 pages.
Asseng et al., "Uncertainty in simulating wheat yields under climate change," Nature Climate Change, 2013, pp. 827-832, vol. 3, No. 9.
Attonaty et al., "Using Extended Machine Learning and Simulation Technics to Design Crop Management Strategies," First European Conference for Information Technology in Agriculture, Copenhagen (Denmark), 1997, 6 pages.
Bassu et al., "How do various maize crop models vary in their responses to climate change factors?" Global Change Biology, 2014, pp. 2301-2320, vol. 20, No. 7.
Bergez et al., "Designing crop management systems by simulation," European Journal of Agronomy, 2010, pp. 3-9, vol. 32, No. 1.
Brockman et al., "OpenAI Gym," arXiv:1606.01540v1, Jun. 5, 2016, 4 pages.
Cobos Ph.D. et al., "Why does my soil moisture sensor read negative? Improving Accuracy of dielectric soil moisture sensors," Decagon Devices and Washington State University, Available: http://manuals. decagon. com/RetiredandDiscontinued/Slicksandcontent/Presentations/ SoilMoisture301.pdf, 2010, 50 pages.
Di et al., "Nitrate leaching in temperate agroecosystems: sources, factors and mitigating strategies," Nutrient Cycling in Agroecosystems, 2002, pp. 237-256, vol. 46.
Floehr, Eric, "Weather Forecast Accuracy Analysis," Proceedings of the 9th Python in Science Conference, 2010, pp. 91-94.
Gamble et al., "Safety-first AI for autonomous data centre cooling and industrial control," https://deepmind.google/discover/blog/safety-first-ai-for-autonomous-data-centre-cooling-and-industrial control, Aug. 17, 2018, 8 pages.
Garcia, Frédérick, "Use of Reinforcement Learning and Simulation to Optimize Wheat Crop Technical Management," In Proceedings of the International Congress on Modelling and Simulation, 1999, pp. 801-806.
Gautron et al., "gym-DSSAT: a crop model turned into a Reinforcement Learning environment," Research Report RR-9460, Inria Lille, Jul. 2022, 34 pages.
Gautron et al., "Reinforcement learning for crop management support: Review, prospects and challenges," Computers and Electronics in Agriculture, 2022, 14 pages, vol. 200, No. 107182.
Haarnoja et al., "Soft Actor-Critic: Off-Policy Maximum Entropy Deep Reinforcement Learning with a Stochastic Actor," In International Conference on Machine Learning (PMLR), 2018, pp. 1861-1870.
Heinemann et al., "Forecasting of Solar Radiation," Solar Energy Resource Management for Electricity Generation from Local Level to Global Scale, Nova Science Publishers, New York, 2006, pp. 83-94.
Hoogendoom et al., "The DSSAT crop modeling ecosystem," Advances in Crop Modeling for a Sustainable Agriculture, 2019, pp. 173-216, Burleigh Dodds Science Publishing, Cambridge, United Kingdom.
Hussein et al., "Imitation Learning: A Survey of Learning Methods," ACM Computing Surveys (CSUR), 2017, pp. 1-35, vol. 50, No. 2.
Hwangbo et al., "Learning agile and dynamic motor skills for legged robots," Science Robotics, 2019, 13 pages, vol. 4.
Jin et al., "Real-Time Bidding with Multi-Agent Reinforcement Learning in Display Advertising," arXiv:1802.09756v2, In Proceedings of the 27th ACM International Conference on Information and Knowledge Management, 2018. pp. 2193-2201.
Jones et al., "Brief history of agricultural systems modeling," Agricultural Systems, 2016, pp. 240-254, vol. 155.
Jones et al., "The DSSAT cropping system model," European Journal of Agronomy, 2003, pp. 235-265, vol. 18, Nos. 3-4.
Kaufmann et al., "Deep Drone Racing: Learning Agile Flight in Dynamic Environments," arXiv:1806.08548v3, in 2nd Conference on Robot Learning, 2018, pp. 133-145.
Kingma et al., "Adam: A Method for Stochastic Optimization," arXiv:1412.6980v9, Jan. 30, 2017, 15 pages.
Malik et al., "DSSAT-CERES-maize modelling to improve irrigation and nitrogen management practices under Mediterranean conditions," Agricultural Water Management, 2019, pp. 298-308, vol. 213.
Mandrini et al., "Exploring Trade-Offs Between Profit, Yield, and the Environmental Footprint of Potential Nitrogen Fertilizer Regulations in the US Midwest," Frontiers in Plant Science, Apr. 2022, 16 pages, 13, vol. 13, Article 852116.
Mandrini et al., "Understanding differences between static and dynamic nitrogen fertilizer tools using simulation modeling," Agricultural Systems, 2021, 13 pages, vol. 194, Article 103275.
Mnih et al., "Human-level control through deep reinforcement learning," Nature, Feb. 26, 2015, pp. 529-533, vol. 518.
Muškardin et al., "Reinforcement Learning under Partial Observability Guided by Learned Environment Models," arXiv:2206.11708V1, Jun. 23, 2022, 17 pages.
Osa et al., "An Algorithmic Perspective on Imitation Learning," Foundations and Trends in Robotics, 2018, pp. 1-179, vol. 7, No. 1-2.
Overweg et al., "CropGym: A Reinforcement Learning Environment for Crop Management," arXiv:2104.04326V2, Apr. 12, 2021, 8 pages.
Palmer et al., "The influence of organic and conventional fertilisation and crop protection practices, preceding crop, harvest year and weather conditions on yield and quality of potato (*Solanum tuberosum*) in a long-term management trial," European Journal of Agronomy, 2013, pp. 83-92, vol. 49.
Peng et al., "Sim-to-Real Transfer of Robotic Control with Dynamics Randomization," arXiv:1710.06537v3, In IEEE International Conference on Robotics and Automation (ICRA), 2018, pp. 3803-3810.
Reddy et al., "Crop management factors influencing yield and quality of crop residues," Field Crops Research, 2003, pp. 57-77, vol. 84, Nos. 1-2.
Richardson, C. W., "Weather Simulation for Crop Management Models," Transactions of the ASAE, 1985, 28(5), pp. 1602-1606, vol. 28, No. 5.
Salo et al., "Crops and Soils Research Paper—Comparing the performance of 11 crop simulation models in predicting yield response to nitrogen fertilization," Journal of Agricultural Science, 2016, pp. 1218-1240, vol. 154.
Searchinger et al., "Creating a Sustainable Food Future: A Menu of Solutions to Feed Nearly 10 billion people by 2050," Final Report, World Resources Institute, 2019, 564 pages.
Shibu et al., "LINTUL3, a simulation model for nitrogen-limited situations: Application to rice," European Journal of Agronomy, 2010, pp. 255-271, vol. 32.
Skhiri et al., "Impact of sprinkler irrigation management on the Del Reguero river (Spain). I: Water balance and irrigation performance," Agricultural Water Management, 2012, pp. 120-129, vol. 103.
Song et al., "Autonomous Drone Racing with Deep Reinforcement Learning," arXiv:2103.08624v2, Aug. 2, 2021, 8 pages.
Sun et al., "Reinforcement Learning Control for Water-Efficient Agricultural Irrigation," In 2017 IEEE International Symposium on Parallel and Distributed Processing with Applications and 2017

(56) References Cited

OTHER PUBLICATIONS

IEEE International Conference on Ubiquitous Computing and Communications (ISPA/IUCC), 2017, pp. 1334-1341.
Sutton et al., "Reinforcement Learning: An Introduction," A Bradford Book, MIT press, 2014, 2015, 352 pages.
Sutton et al., "Too much of a good thing," Nature, Apr. 14, 2011, pp. 159-161, vol. 472.
Tao et al., "Optimizing Crop Management with Reinforcement Learning and Imitation Learning," arXiv:2209.09991V2, Feb. 27, 2023, 10 pages.
Tobin et al., "Domain Randomization for Transferring Deep Neural Networks from Simulation to the Real World," arXiv:1703.06097v1, In IEEE/RSJ International Conference on Intelligent Robots and Systems (IROS), 2017, pp. 23-30.
Vinyals et al., "Grandmaster level in StarCraft II using multi-agent reinforcement learning," Nature, Nov. 14, 2019, pp. 350-354, vol. 575.
Wright et al., "Field Corn Production Guide," University of Florida—IFAS Extension, SS-AGR-85, doi.org/10.32473/edis-ag202-2022, 2022, 13 pages.
Wu et al., "Optimizing Nitrogen Management with Deep Reinforcement Learning and Crop Simulations," Proceedings of the IEEE/CVF Conference on Computer Vision and Pattern Recognition Workshops, 2022, pp. 1711-1719.
Zhang et al., "Query-Efficient Imitation Learning for End-to-End Autonomous Driving," arXiv:1605.06450V1, May 20, 2016, 12 pages.
Zhao, W.; Queralta, J. P.; and Westerlund, T., Sim-toreal transfer in deep reinforcement learning for robotics: a survey, in 2020 IEEE symposium series on computational intelligence (SSCI), 2020, 737-744. IEEE.
Yoon, J.; Zhang, Y.; Jordon, J.; and Van der Schaar, M., Vime: Extending the success of self- and semi-supervised learning to tabular domain, Advances in Neural Information Processing Systems, 2020, 33: 11033-11043.
Romain, G.; Philippe, P.; Julien, B.; Odalric-Ambrym, M.; David, E.; et al., gym-DSSAT: a crop model turned into a Reinforcement Learning environment, 2022, arXiv preprint arXiv:2207.03270.
Raman, S. S.; Cohen, V.; Rosen, E.; Idrees, I.; Paulius, D.; and Tellex, S., Planning with large language models via corrective re-prompting, in NeurIPS 2022 Foundation Models for Decision Making Workshop, 2022.
Mees, O.; Borja-Diaz, J.; and Burgard, W., Grounding language with visual affordances over unstructured data, in 2023 IEEE International Conference on Robotics and Automation (ICRA), 11576-11582. IEEE.
Madondo, M.; Azmat, M.; Dipietro, K.; Horesh, R.; Jacobs, M.; Bawa, A.; Srinivasan, R.; and O'Donncha, F., A SWAT-based Reinforcement Learning Framework for Crop Management, 2023, arXiv preprint arXiv:2302.04988.
Lee, K.-H.; Nachum, O.; Yang, M. S.; Lee, L.; Freeman, D.; Guadarrama, S.; Fischer, I.; Xu, W.; Jang, E.; Michalewski, H.; et al., Multi-game decision transformers, Advances in Neural Information Processing Systems, 2022, 35: 27921-27936.
Janner, M.; Li, Q.; and Levine, S., Offline reinforcement learning as one big sequence modeling problem, Advances in neural information processing systems, 2021, 34: 1273-1286.
Garg, D.; Vaidyanath, S.; Kim, K.; Song, J.; and Ermon, S., LISA: Learning interpretable skill abstractions from language, Advances in Neural Information Processing Systems, 2022, 35: 21711-21724.
Devlin, J.; Chang, M.-W.; Lee, K.; and Toutanova, K., Bert: Pre-training of deep bidirectional transformers for language understanding, 2018, arXiv preprint arXiv:1810.04805.
Ahn, M.; Brohan, A.; Brown, N.; Chebotar, Y.; Cortes, O.; David, B.; Finn, C.; Fu, C.; Gopalakrishnan, K.; Hausman, K.; et al., Do as i can, not as i say: Grounding language in robotic affordances, 2022, arXiv preprint arXiv:2204.01691.
Wu, J. et al., Extended Agriculture-Vision: An Extension of a Large Image Dataset for Agricultural Pattern Analysis, arXiv preprint arXiv:2303.02460, Mar. 2023.

* cited by examiner

METHODS AND SYSTEMS FOR INTELLIGENT AGRICULTURAL MANAGEMENT

CROSS-REFERENCE TO RELATED APPLICATION

The present application claims the benefit of U.S. Provisional Patent Application No. 63/453,717, filed Mar. 21, 2023, the content of which is herewith incorporated by reference.

BACKGROUND

Crop management, including nitrogen (N) fertilization and irrigation management, has a significant impact on crop yield, economic profit, and the environment. Although management guidelines exist, it is challenging to find the optimal management practices given a specific planting environment and crop. Reinforcement learning (RL) and crop simulators have been considered as a solution to the problem, but the trained policies either have limited performance or are not deployable in the real world.

SUMMARY

Embodiments of the present disclosure include systems and methods for crop management. Embodiments of the present disclosure may include a method for agricultural management, including receiving a trained first management policy that was trained with state information. Embodiments may also include training a second management policy using imitation learning. In some embodiments, the imitation learning uses the trained first management policy and partial state information in order to output action information, the partial state information being a portion of the state information.

In some embodiments, the state information may include environment information, and the environment information may include at least one of weather, plant and soil information. In some embodiments, the state information may include at least one of cumulative nitrogen fertilizer applications (kg/ha), days after simulation started, growing degree days for current day (C/d), maize growing state, vegetative growth state (may include number of leaves), plant population density (plant/m$^2$), rainfalls for the current day (mm/d), solar radiations during the current day (MJ/m$^2$/d), maximum temperature for current day (C), minimum temperature for current day (C), index of plant nitrogen stress, massic fraction of nitrogen in grains, index of plant water stress, daily nitrate leaching (kg/ha), cumulative nitrogen denitrification (kg/ha), daily nitrogen denitrification (kg/ha), daily nitrogen plant population uptake (kg/ha), cumulative plant population nitrogen uptake (kg/ha), plant population leaf area index (m$^2$_leaf/m$^2$_soil), top weigh (kg/ha), actual soil evaporation rate (mm/d), calculated runoff (mm/d), depth to water table (cm), root depth (cm), cumulative ammonia volatilization (kgN/ha), volumetric soil water content in soil layers (cm$^2$ [water]/cm$^2$ [soil]).

In some embodiments, the action information may include at least one of the amount of nitrogen (N) input and the amount of irrigation water input. In some embodiments, the method further includes training a first management policy using reinforcement learning to provide the trained first management policy. In some embodiments, the state information may be used in the training.

Embodiments may also include a deep neural network or a deep Q-network (DQN) used to train the first management policy. In some embodiments, the state information used in training the first management policy may be obtained from a crop simulation. In some embodiments, the state information used in training the first management policy may be obtained from the Decision Support System for Agrotechnology Transfer (DSSAT).

Embodiments may also include collecting state action pairs from the trained first management policy and updating the second management policy by minimizing a loss function representing the difference between an output of the second management policy with the partial state information as an input and an action determined by the first management policy given the state information. Embodiments may also include a non-transitory computer-readable medium having stared thereon instructions that, when executed by a computing device, cause the computing device to perform the methods disclosed herein.

Embodiments of the present disclosure may also include a method for agricultural management, including training a first management policy under full observation using reinforcement learning (RL). Embodiments may also include training a second management policy under partial observation using imitation learning (IL). In some embodiments, an action of a trained first management policy may be mimicked.

Embodiments of the present disclosure may also include a system for agricultural management, including a system for agricultural simulation. Embodiments may also include a processor. Embodiments may also include a memory having stored thereon instructions that, when executed by the processor, cause the system to be configured to perform the methods disclosed herein.

In a first aspect, a method for agricultural management is provided. The method includes providing a trained first management policy. The trained first management policy was trained using a reinforcement learning method and a first set of state information. The method also includes training a second management policy using an imitation learning method and a second set of state information so as to provide a trained second management policy. The imitation learning method is based on the trained first management policy. The second set of state information includes a subset of the first set of state information. The method also includes receiving, at runtime, from at least one sensor, information indicative of at least one environmental condition. The method yet further includes outputting action information based on the trained second management policy and the at least one environmental condition.

In a second aspect, a system for agricultural management is provided. The system includes one or more sensors configured to collect information indicative of at least one environmental condition. The system also includes a controller having at least one processor and a memory configured to store program instructions. The processor is operable to execute the program instructions to carry out operations. The operations include providing, by the controller, a trained first management policy. The trained first management policy was trained using a reinforcement learning method and a first set of state information. The operations also include training, by the controller, a second management policy using an imitation learning method and a second set of state information so as to provide a trained second management policy. The imitation learning method is based on the trained first management policy. The second set of state information includes a subset of the first set of state information. The operations additionally include receiving, at runtime, from the one or more one sensors, information indicative of at least one environmental condition. The operations yet further include outputting action information based on the trained second management policy and the at least one environmental condition.

In a third aspect, a method of training a management policy for agricultural operations is provided. The method includes providing a trained first management policy. The trained first management policy was trained using a reinforcement learning method and a first set of state information. The method also includes training a second management policy using an imitation learning method and a second set of state information so as to provide a trained second management policy. The imitation learning method is based on the trained first management policy. The second set of state information includes a subset of the first set of state information. The method also includes outputting the trained second management policy.

These and other features, objects and advantages of the present invention will become better understood from the description that follows. In the description, reference is made to the accompanying drawings, which form a part hereof and in which there is shown by way of illustration, not limitation, embodiments of the invention.

Figure 1A:
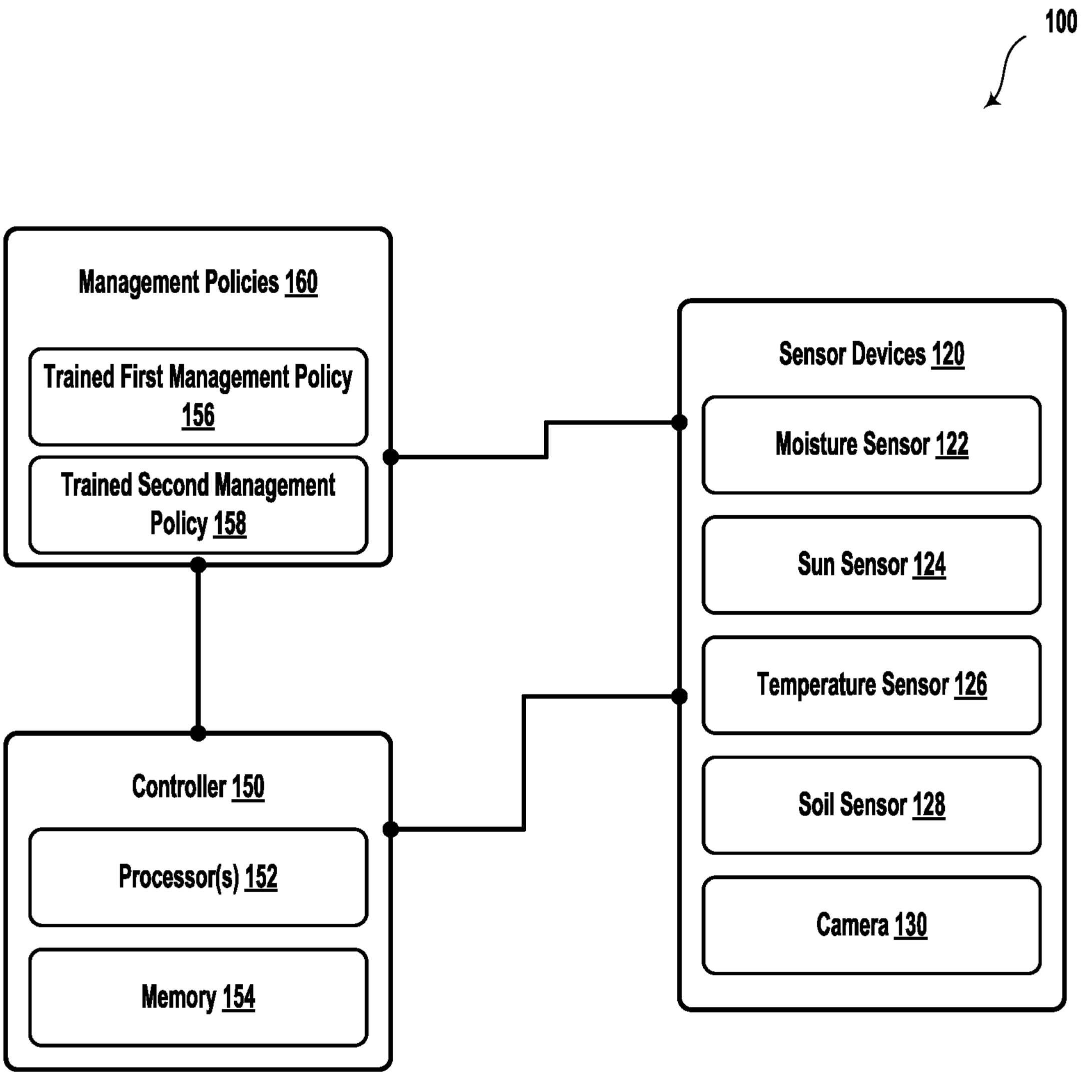
FIG. 1A illustrates an example system for intelligent agricultural management, according to example embodiments.

While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the disclosure.

DETAILED DESCRIPTION

For the purpose of promoting an understanding of the principles of the technology, reference will now be made to certain embodiments thereof and specific language will be used to describe the same. It will nevertheless be understood that no limitation of the scope of the invention is thereby intended, such alterations, further modifications and applications of the principles of the technology as illustrated herein being contemplated as would normally occur to one of skill in the art.

Likewise, many modifications and other embodiments of the technology described herein will come to mind to one of skill in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms are employed herein, they are used in a generic and descriptive sense only and not for purposes of limitation. Unless defined otherwise, all technical and scientific terms used herein have the same meaning as commonly understood by one of skill in the art to which the invention pertains.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Embodiments of the present disclosure include systems and methods for crop management. In some embodiments, an intelligent crop management system optimizes the N fertilization and irrigation simultaneously using RL, imitation learning (IL), and crop simulations. Certain embodiments may utilize the Decision Support System for Agrotechnology Transfer (DSSAT) for crop simulation.

In some embodiments, systems and methods for crop management first use deep RL (e.g., deep Q-network) to train management policies that require all state information from the simulator as observations (denoted as full observation). In some embodiments, IL is then invoked to train management policies that only need a limited amount of state information that can be readily obtained in the real world (denoted as partial observation) by mimicking the actions of the previously RL-trained policies under full observation.

In an exemplary implementation, experiments on a case study are conducted using maize in Florida, and trained policies with a maize management guideline in simulations are compared. The trained policies under both full and partial observations achieve better outcomes, resulting in a higher profit or a similar profit with a smaller environmental impact. Moreover, the partial-observation management policies are directly deployable in the real world as they use readily available information.

I. INTRODUCTION

The world's agricultural system is facing significant challenges. It needs to produce food for a population expected to reach 9.6 billion by 2050, and simultaneously reduce environmental impacts, including ecosystem degradation and high greenhouse gas emissions. There are plenty of management factors influencing the crop yield and environment impact, among which nitrogen (N) fertilization and irrigation are two of the most significant. Based on empirical experience and existing agricultural studies, local best management practice for N fertilization and irrigation exist among farmers. However, it remains to be seen whether the current management practices are optimal and whether these strategies perform well in the presence of changes in climate, yield price, and management cost. Thus, new methods are urgently needed to help farmers build cost-effective and readily deployable systems that provide optimal management policies given a particular condition (including climate, yield price, management cost, etc.) and a target (e.g., maximum economic profit). Reinforcement learning (RL) has the ability to solve tasks involving sequential decision making (SDM), and may be utilized in optimizing crop management. As plentiful interactions between the RL agent and the environment are required for policy training, it is impractical to implement field trial-based methods, which necessitates the use of agricultural simulation models for RL-based training.

Policies for nitrogen (N) management have been trained using deep RL and the Decision Support System for Agrotechnology Transfer (DSSAT), one of the most widely used crop models in the world. The trained policies under full observations outperformed a baseline policy by achieving a higher yield or a similar yield with less N fertilizer input. However, there are limitations in the approach. First, variables optimized were limited in number as only N management was included. Also, only one reward function was adopted in the tests and it is unclear whether their framework works well for various situations with different reward functions. More importantly, the trained policies under full observations are not implementable in the real world as they need much information that is not accessible by farmers such as nitrate leaching and plant nitrogen uptake on each day. Although experiments were conducted on policy training under partial observation, using only easily obtained or measured states in reality, the training results could not outperform the baseline policy, let alone the ones under full observation.

II. DETAILED DESCRIPTION OF THE DRAWINGS

Embodiments of the present disclosure include intelligent crop management systems and methods of intelligent crop management.

FIG. 1A illustrates a system 100 for intelligent agricultural management, according to example embodiments. The system 100 may include one or more controllers 150, which may include one or more processors 152 and memory 154. The memory 154 may store information indicative of an environmental condition of an agricultural operation. This information stored in the memory 154 may be state information of an agricultural operation. The information indicative of an agricultural operation may include, but is not limited to: cumulative nitrogen fertilizer applications (kg/ha), days after simulation started, growing degree days for current day (C/d), maize growing state, vegetative growth state (may include number of leaves), plant population density (plant/$m^2$), rainfalls for the current day (mm/d), solar radiations during the current day (MJ/$m^2$/d), maximum temperature for current day (C), minimum temperature for current day (C), index of plant nitrogen stress, massic fraction of nitrogen in grains, index of plant water stress, daily nitrate leaching (kg/ha), cumulative nitrogen denitrification (kg/ha), daily nitrogen denitrification (kg/ha), daily nitrogen plant population uptake (kg/ha), cumulative plant population nitrogen uptake (kg/ha), plant population leaf area index ($m^2$_leaf/$m^2$_soil), top weigh (kg/ha), actual soil evaporation rate (mm/d), calculated runoff (mm/d), depth to water table (cm), root depth (cm), cumulative ammonia volatilization (kgN/ha), or volumetric soil water content in soil layers ($cm^2$ [water]/$cm^2$ [soil]).

The system 100 may also include one or more management policies 160. These management policies may be trained by one or more machine learning models or other predictive models by the controller 150. The management policies 160 may also be stored on the memory 154. These management policies may comprise one or more recommendations for actions to be taken in an agricultural operation. The management policies 160 may also include a trained first management policy 156 and a trained second management policy 158. The trained first management policy 156 may be trained by a reinforcement learning model on the controller 150. The trained second management policy 158 may be trained using an imitation learning model based on imitating the trained first management policy 156.

The system 100 may also include one or more sensor devices 120 that record information indicative of an environmental condition of an agricultural operation. The sensor devices 120 may include, but are not limited to, a moisture sensor 122, a light sensor 124, a temperature sensor 126, a soil sensor 128, and/or a camera 130. The information indicative of an environmental condition of an agricultural operation may include, but is not limited to, any of the data points detailed in the above disclosure. The information indicative of an environmental condition of an agricultural operation may be used to train the management policies 160, or to inform the actions recommended by the management policies 160.

The moisture sensor may be configured to collect information indicative of an atmospheric moisture of the environment of the agricultural operation, or it may collect information indicative of a surface moisture level of a plant or other surface. The light sensor 124 may be configured to collect information indicative of a current or historical level of sunshine or shade on at least one area of an agricultural operation. The temperature sensor 126 may be configured to collect information indicative of a current or historical temperature of at least one area of the environment of the agricultural operation. Additionally or alternatively, the temperature sensor 126 may collect information indicative of a surface temperature of a plant or other surface of the agricultural operation.

The soil sensor 128 may be configured to collect data indicative of soil conditions of the agricultural operation. The soil conditions of the agricultural operation may include, but are not limited to: soil moisture, soil mineral content, nitrogen levels, nitrogen fertilizer content, root density, soil temperature, nitrogen denitrification, nitrate leaching, depth to water table, and root depth. The soil sensor 128 may be disposed within the soil itself, or it may record data indicative of soil conditions remotely. It may also be based on historical soil data.

The camera 130 may be configured to collect a variety of information. Visual data recorded from the camera 130 may be used to establish the presence of pests, the occurrence of a crop disease, the motions of crops and/or animals, or other data. The data recorded from the camera 130 may also be used to establish and/or confirm data recorded by another sensor.

Figure 1B:
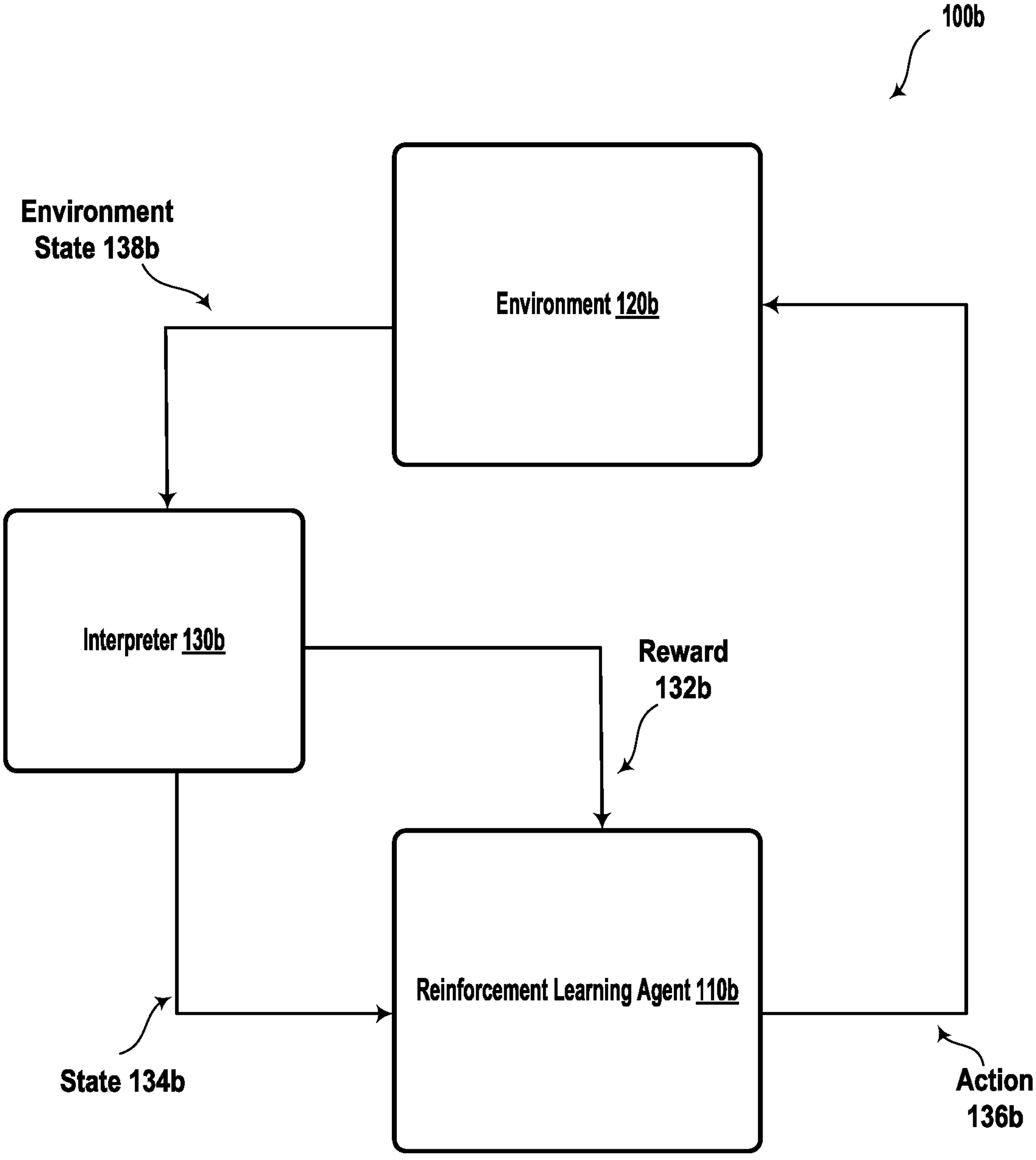
FIG. 1B illustrates a reinforcement learning training process, according to example embodiments.

FIG. 1B illustrates a reinforcement learning training process, according to example embodiments. The example embodiment illustrated in FIG. 1B trains a reinforcement learning model to output action recommendations to maximize a reward function on an environment.

The reinforcement learning training process 100*b* may include a reinforcement learning agent 110*b*, the reinforcement learning agent 110*b* may be a neural network configured to output recommendations for one or more actions 136*b* on an environment 120*b*. The environment 120*b* may be any environment which comprises one or more data points to train the reinforcement learning agent. The environment 120*b* may output environment state information 138*b* to an interpreter 130*b*. The interpreter 130*b* may transform this environment state information 138*b* to state information 134*b* that may be outputted to the reinforcement learning agent 110*b*. Furthermore, the interpreter 130*b* may output a reward 132*b* based on a reward function to the reinforcement learning agent 110*b*. By training the reinforcement learning agent 110*b* to output one or more actions 136*b* that maximize the reward 132*b*, a trained reinforcement learning agent may be established.

Figure 1C:
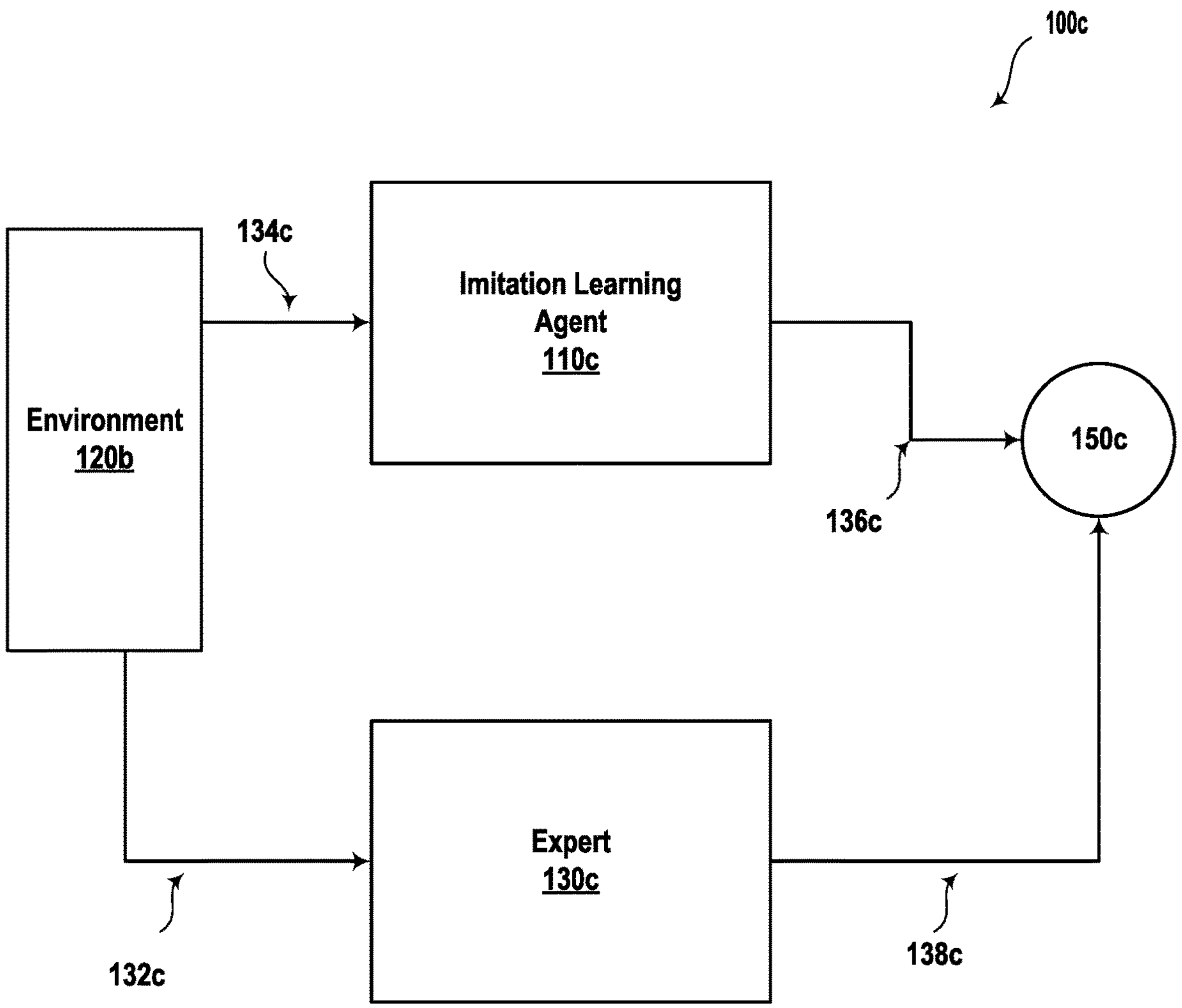
FIG. 1C illustrates an imitation learning training process, according to example embodiments.

FIG. 1C illustrates an imitation learning training process, according to example embodiments. The imitation learning agent training process 100*c* may include an imitation learning agent 110*c*. The imitation learning agent 110*c* may be a neural network. The imitation learning agent 110*c* receives state information 134*c* from an environment 120*b* that may comprise one or more state-action pairs. The one or more state-action pairs may describe actions taken by the expert 130*c* on the environment 120*b* . . . . The state information 134*c* may also be a subset of the set of state information that the expert 130*c* was trained on. The environment 120*b* may also provide state information 132*c* to the expert 130*c*.

The expert 130*c* may be a first trained reinforcement learning agent, trained by a process similar to that illustrated in FIG. 1B. The first trained reinforcement learning agent may also be trained by a method other than that in FIG. 1B. The expert 130*c* may represent an expert or optimal model for recommending actions to be taken on the environment 120*b* to maximize reward information. The reward information may represent the result of actions taken by the expert 130*c* on the environment 120*b* based on a reward function.

The imitation learning agent 110*c* may be trained by the imitation learning agent training process 100*c* to produce a trained imitation learning agent 150*c* that may utilize one or more recommendations for actions 136*c* provided by the imitation learning agent 110*c* to be implemented in the environment 120*b*. These actions may imitate or attempt to replicate the actions of the expert 130*c*.

Figure 2A:
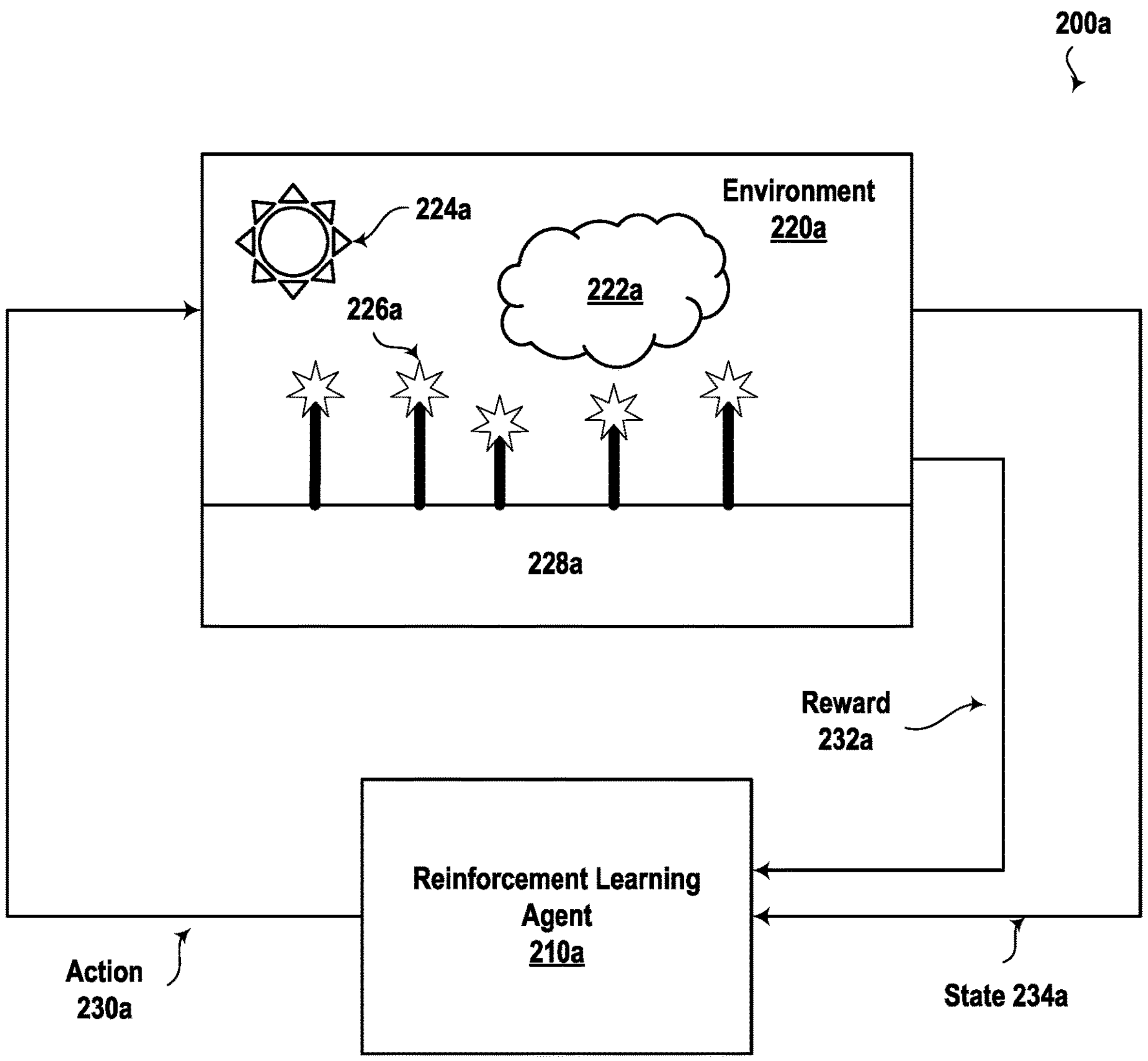
FIG. 2A illustrates a reinforcement learning training process for intelligent agricultural management, according to example embodiments.

FIG. 2A illustrates a reinforcement learning training process for intelligent agricultural management, according to example embodiments. The reinforcement learning training process 200*a* generates adaptable management policies based on RL, crop simulations (e.g., simulations via DSSAT), and/or real-world agricultural operations. The example embodiment illustrated in FIG. 2A trains a reinforcement learning model to output action recommendations to maximize a reward function on an agricultural operation or crop simulation.

The reinforcement learning training process 200*a* may include a reinforcement learning agent 210*a*, and an environment 220*a*. The environment 220*a* may represent a crop simulation, a real-world agricultural operation, or an agricultural operation focused on animal husbandry, such as a dairy farm, pasture, or concentrated animal feed operation (CAFO). The environment 220*a* may include informative indicative of an environmental condition, such as sunshine 224*a*, weather conditions 222*a*, information indicative of crop or animal conditions 226*a*, and soil conditions 228*a*. These data may be aggregated into state information 234*a*, which may be provided to the reinforcement learning agent 210*a*. These data may also be aggregated into reward information 232*a* provided to the reinforcement learning agent 210*a*, representing profit, growth, or other conditions of the environment 220*a*. At runtime, the reinforcement learning agent may recommend one or more actions 230*a* and provide the one or more actions to the environment 220*a*.

III. MARKOV DECISION PROCESSES PROBLEM FORMULATION

The actions 230*a* recommended by the reinforcement learning agent 210*a* in FIG. 2A may be nitrogen (N) fertilization and irrigation management. The N fertilization and irrigation management is formulated as a finite Markov decision processes (MDP) problem here. On each day t, the agent 210*a* receives the states of the environment, St, and chooses the action 230*a* at from the action space A. St contains information recorded from the environment 220*a* related to the weather, plant, and soil at given day, and the detailed composition of the state space can be found in Table 7 from (Wu, J.; Tao, R.; Zhao, P.; Martin, N. F.; and Hovakimyan, N. 2022. Optimizing Nitrogen Management with Deep Reinforcement Learning and Crop Simulations. In Proceedings of the IEEE/CVF Conference on Computer Vision and Pattern Recognition, 1712-1720.) which is hereby incorporated by reference as if set forth in its entirety. $a_t$ is comprised of the amount of N fertilizer input, $N_t$, and the amount of irrigation water input, $W_t$, for that day. Given St and at, a reward 232*a* $r_t(s_t, a_t)$ can be calculated, and the agent aims to find the optimal at that maximizes the future discounted return, which is defined as $$R_t = \sum_{\tau=t}^{T} \gamma^{\tau-t} r_\tau,$$

where $\gamma$ is the discounted factor to be designed. The reward 232*a* function $r_t(s_t, a_t)$ at day t is defined as:

$$r_t(s_t, a_t) = \begin{cases} w_1 Y - w_2 N_t - w_3 W_t - w_4 N_{l,t} & \text{if harvest at } t, \\ -w_2 N_t - w_3 W_t - w_4 N_{l,t} & \text{otherwise,} \end{cases} \tag{1}$$

where $w_1$, $w_2$, $w_3$, $w_4$, Y, $N_{l,t}$ are weight factors to be determined, yield, and the amount of nitrate leaching respectively. Y and $N_{l,t}$ are variables in St.

IV. TRAINING MANAGEMENT POLICIES UNDER FULL OBSERVATION USING DEEP RL

In some example embodiments of the reinforcement learning agent 210*a*, a Deep Q-network (DQN) is selected for policy training, and a deep neural network is used to present the action-value function, also known as the Q function. The Q function is defined as $Q^*(s, a)=\max_{\pi} \mathbb{E}[R_t|s_t=s, a_t=a, \pi]$, where $\pi$ is a policy. Given a Q* function and an action $s_t$, a greedy policy defined as $a^*_t=\max_{a\in A} Q^*(s_t, a)$ is often used to find the optimal action 230*a* $a_t$. The neural network parameter at iteration i, denoted by $\theta_i$, is updated by minimizing the loss function:

$$L_i(\theta_i) \triangleq \mathbb{E}_{(s,a,r,s')}\left[r + \gamma \max_{a'\in\mathcal{A}} Q(s', a'; \theta_i^-) - Q(s, a; \theta_i)\right], \quad (2)$$

Where s, a, r, s', and $\gamma$ denote current state, current action 230*a*, current reward 232*a* of s and a, next state, and discount factor respectively, and $$\theta_i^-$$

is the parameter of the target network. The tuples (s, a, r, s') are randomly chosen from the replay buffer, which is a memory base of previous tuples (s, a, r, s' during training. The RL-trained policies under full observation are used later as the experts during IL.

V. CROP SIMULATIONS AND DAILY INTERACTIONS WITH DSSAT AND GYM-DSSAT

Although widely used for decades, DSSAT has a severe issue that the users cannot change the setup of the simulation once started, which makes real-time management decisions impossible. The communication gap between the simulation and the reinforcement learning agent 210*a* is bridged by Gym-DSSAT, which enables the reinforcement learning agent 210*a* to interact with the simulated environment from DSSAT (i.e., reading the weather, soil, and crop information and applying management practices) on a daily basis.

The performance of an example implementation of an intelligent crop management system and method is evaluated with a case study of maize crop in Florida by comparing the results of all the trained policies with that of a baseline policy following a corn production guide for farmers in Florida. In the example implementation, the action space is expanded by including irrigation, another essential management practice as irrigated land represents 20 percent of the total cultivated land and contributes 40 percent of the total food produced worldwide. Secondly, we investigate the RL-based policy training with different reward functions that represent different tradeoff among crop yield, N fertilizer use, water use, and environment impact during the crop growth cycle. The adaptation of the trained policies is also analyzed when a different target, represented by the reward function, is provided. Significantly, IL is leveraged as a new tool to find the optimal management policies that require only state information that can be easily obtained or measured in the real world as the input (partial observation). Since all the required input for trained policies under partial observation can be easily acquired in the real world, the path to deployment of an intelligent crop management system is prepared, and field tests can be conducted to prove the effectiveness of the trained policies.

VI. POLICY TRAINING UNDER FULL OBSERVATION WITH RL

DQN was implemented for training management policies under full observation. The present disclosure provides 5 different reward functions with different meanings in reality to demonstrate the adaptability of the framework.

Implementation Details. In some example embodiments, the Q-network used for training the reinforcement learning agent 210*a* was designed to have 3 hidden layers with 256 units in each layer. The discrete action space was set as:

$$\mathcal{A} = \left\{40\ k\frac{\text{kg}}{\text{ha}}\ N \text{ fertilizer} \,\&\, 6\ k\frac{\text{L}}{\text{m}^2} \text{ Irrigation water} \,\middle|\, k = 0, 1, 2, 3, 4\right\},$$

with a size of 25. The discount factor was set to be 0.99. For updating the Q-network, some example embodiments utilized a Pytorch and/or Adam optimizer with an initial learning rate of 1e-5 and a batch size of 640.

In some example embodiments, five different functions for rt were used to train the RL agent, and the parameters used in each reward function (RF) are listed in Table 1. RF 1 represents the economic profit ($/ha) that farmers gain based on the approximate price of maize and cost of N fertilizer and irrigation water from (Mandrini et al. 2022) and (Wright et al. 2004). RFs 2-4 indicate the economic profit under different situations. For example, RF 2 represents the extreme case when irrigation water is free, and RF 4 mimics the situation when the price of N fertilizer is doubled. Compared with RFs 1-4 which consider economic profit only, RF 5 includes the additional term of nitrate leaching, an environmental factor. Nitrate leaching is a major cause of environmental problems including eutrophication of watercourses and soil degradation (Wu et al. 2022), and thus unfavorable. RF 5 is designed with similar weights on Yield, N, and W, and a much larger weight on nitrate leaching to promote minimal nitrate leaching.

TABLE 1

Parameters in each reward function (RF).

| | $w_1$ | $w_2$ | $w_3$ | $w_4$ |
|---|---|---|---|---|
| RF 1 | 0.158 | 0.79 | 1.1 | 0 |
| RF 2 | 0.158 | 0.79 | 0 | 0 |
| RF 3 | 0.158 | 0.79 | 0.55 | 0 |
| RF 4 | 0.158 | 1.58 | 1.1 | 0 |
| RF 5 | 0.2 | 1 | 1 | 5 |

Policy Evaluation. Policies were trained under each reward function design.

The evaluation results of all the trained policies under full observation are shown in Table 2 and Table 3. It's worth mentioning that due to the random initialization of the Q-network and the fact that the Q-network gets updated every episode, the policies evaluated above may not represent the most ideal one from training. However, the trained policies we picked are representative enough to demonstrate the ability of RL to optimize crop management and the influence of the reward functions on the training results. According to Table 2, the reward function 232*a* affects the strategy of the trained policy. For example, with RF 2, which indicates zero cost of irrigation water, the trained policy decides to apply much more irrigation water than the rest, which leads to a much higher yield and the largest cumulative reward. In addition, Trained Policy 3 chooses to apply less N fertilizer due to the higher cost of N fertilizers represented in the RF 3. According to Table 3, all the trained policies outperform the baseline policy under all the RFs (except Trained Policy 2 under RF 1). Trained Policy 5 achieves the largest cumulative reward calculated with RFs 1, 3, 4, and 5, which may be attributed to the stochasticity in the training process and the benefit of penalizing nitrate leaching through the reward in helping the RL agent find an optimal or near optimal policy. Ignoring trained policy 5, we see that given a RF to compute the cumulative rewards of different trained policies, the largest reward is almost always achieved by the policy trained with this particular RF (e.g., Trained Policy 3 earns the highest reward with RF 3 among Trained Policies 1, 2, 3, and 4). In general, the results above demonstrate the ability of RL to optimize crop management under different criteria.

TABLE 2

Evaluation results of trained policies under full observation and the baseline policy.

| | N Input (kg/ha) | Water Input (L/m$^2$) | $N_l$ (kg/ha) | Yield (kg/ha) |
|---|---|---|---|---|
| Baseline Policy | 360 | 393.7 | 212.6 | 10771.5 |
| Trained Policy 1 | 240 | 156 | 38.5 | 10998 |
| Trained Policy 2 | 240 | 594 | 69.2 | 11291.8 |
| Trained Policy 3 | 240 | 168 | 37.3 | 11109.3 |
| Trained Policy 4 | 160 | 108 | 41.9 | 10116.7 |
| Trained Policy 5 | 200 | 138 | 39.2 | 10926.1 |

TABLE 3

Performance of the baseline policy and trained policies in terms of cumulative reward computed using different reward functions (RF).

| | RF 1 | RF 2 | RF 3 | RF 4 | RF 5 |
|---|---|---|---|---|---|
| Baseline Policy | 984 | 1418 | 1201 | 700.0 | 338 |
| Trained Policy 1 | 1377 | 1548 | 1462 | 1187 | 1611 |
| Trained Policy 2 | 941 | **1595** | 1268 | 752 | 1078 |
| Trained Policy 3 | 1381 | 1566 | 1473 | 1191 | 1627 |
| Trained Policy 4 | 1353 | 1472 | 1413 | 1227 | 1546 |
| Trained Policy 5 | **1417** | 1568 | **1492** | **1259** | **1651** |

For each RF, the largest cumulative reward value is shown in bold.

Application history of N fertilizer and irrigation water from all the trained policies in the one or more actions 230*a* are also analyzed. For illustration purpose, the application history of the baseline policy and Trained Policy 1 is visualized in FIG. 3. For all of the trained policies, most N fertilizer and irrigation water are applied during April-June, which is the crucial growth period for maize.

Example Results of Policy Training with RL. In some embodiments, partial observation may be used in training the RL agent 210*a*. Partial observation may allow the RL agent 210*a* to be trained on a more representative set of data from the environment 220*a* that comprises data that can feasibly be established from real-world agricultural operations. In some example embodiments, the setup was identical to the case of full observation, except that the state space used here was smaller. Although the present disclosure provides different dimensions of the neural network, learning rate, decay rate of e and batch size, all trained policies converged to a single policy which applies 0 N fertilizer and 0 irrigation water every day in an example embodiment. Thus, it is much challenging to find a good policy under partial observation with RL, which works well for policy training under full observation. The unsatisfactory training results from RL under partial observation motivate us to leverage IL, a much easier and straightforward approach, for policy training under partial observation.

Uncertainty with weather and the mismatch between the crop models used to train the policies and the real cropping system may present challenges when trained management policies are performed in the real world. To improve the robustness of the trained management policies, domain and dynamics randomization techniques may be implemented. More specifically, one may perturb selected key parameters of the model and randomize weather conditions when training the policy, which could "force" the trained policies to be robust against model and weather uncertainties.

In an example embodiment, the IL-trained management policies for the partial observation case may be readily deployed on a real agricultural operation as all the 12 states used by the policies can be easily observed or measured with sensors. Soil and climate data corresponding to the farm for field tests need to be collected to configure the crop model within DSSAT, and shall be used for policy training. After training, on each day, given the current soil and weather information, the trained policies will make management decisions, i.e., how much N fertilizers and water to add, and farmers or experimenters can then follow these decisions to apply the management practices. After harvest, based on the amount of water and fertilizer used, and the crop yield, the performance of the management policies can be evaluated.

VII. TRAINING MANAGEMENT POLICIES UNDER PARTIAL OBSERVATION USING IMITATION LEARNING

Figure 2B:
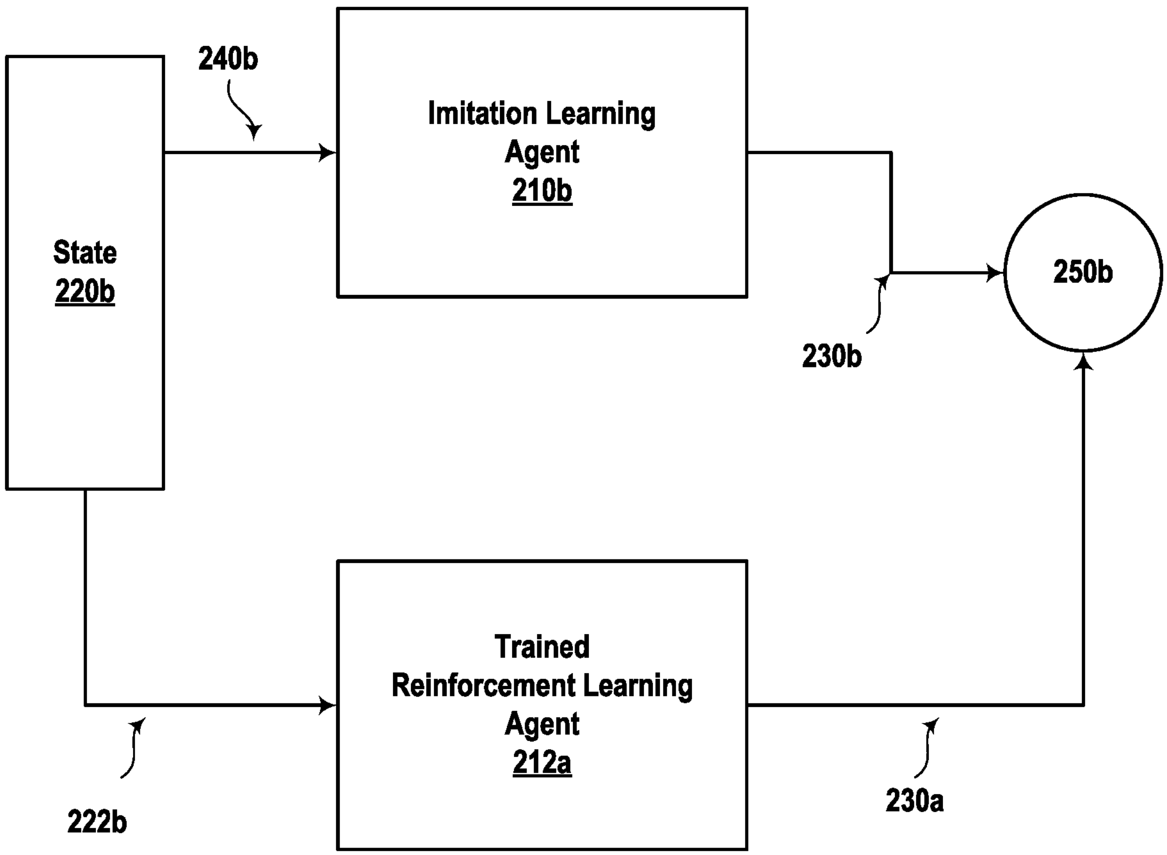
FIG. 2B illustrates an imitation learning training process for intelligent agricultural management, according to example embodiments.

FIG. 2B illustrates an imitation learning training process for intelligent agricultural management, according to example embodiments. In imitation learning (IL), the IL agent 210*b* learns to accomplish a task by mimicking the behavior of an expert, as opposed to learning from scratch by trial-and-error in RL. For the crop management problem, when an expert policy, which in the example embodiment may be a trained reinforcement learning agent 210*a*, is provided, behavior cloning, the simplest form of IL, can be applied to train a new policy network, $\pi(s, \theta)$, with the parameters $\theta$, as follows. We first collect demonstrations, state-action pairs (s, a), from the expert policy 212*a* and store them into a state dataset D, 220*b*. Then, the policy network is updated by minimizing the loss function: $L(\theta)=\Sigma_{s \in D} \|\pi(s, \theta)-a\|$, which represent the difference between the output of the policy network with the state s, 220*b*, as the input, and a, the action determined by the expert policy 230*a* given s.

Policy Training with IL. With IL, the policies were trained by imitating the actions determined by the experts, which are the previously RL-trained policies under full observation. FIG. 2B shows the individual process of training an IL agent 210*b* based on at least one expert policy 212*a*. In some embodiments, a mean squared error loss function may be applied to the actions 230*b* and stochastic gradient descent algorithms were used to solve the optimization problem.

The present disclosure provides 2 experiments performed on training an IL agent 210*b*, one with Trained Policy 1 as the expert policy 212*a*, and the other with Trained Policy 5 as the expert policy 212*a*. The expert policy 212*a* could also be a real-world policy in some example embodiments, or provided by a simulation or other model. In some example embodiments, a deep neural network is used to represent the policy again with 3 hidden layers and 256 units. However, the outputted actions 230*a* of the network, which has a different dimension of two here, represents the amount of N fertilizer and irrigation water, respectively. A Sigmoid function was used at the last layer of the network to restrict its output such that the first element is between 0-160 and the second element between 0-24. For the case study with Trained Policy 1 as the expert, the batch size was set to be 10, and for that with Trained Policy 5, the batch size was 64.

Training the imitation learning agent 210*b* may produce recommended actions 230*b* which are integrated into a trained imitation learning agent 250*b*. The trained imitation learning agent 250*b* may be configured to recommend actions for agricultural management based on the state 220*b*.

Note that the policy to be trained here has a continuous action space, while the action space of RL-trained policies is discrete. In some embodiments, a continuous action space may lead to unrealistic behavior because the trained policy is very likely to decide to take actions frequently, applying a small amount of fertilizer and irrigation every day, which is impractical for farmers to follow. Thus, the present disclosure also provides methods for evaluating the trained policies with 'round', in which the intelligent agricultural management system rounds the action determined by the policy to the closest value in the action space A used in RL training. The evaluation results of the trained policies are shown in Table 4. Based on these results, the IL-trained policies under partial observation achieved higher cumulative rewards compared to the baseline policy with both RF 1 and 5. In addition, the actions determined by the IL-trained policies are very similar to those from the experts, and almost identical when actions are actions.

TABLE 4

Performance comparison between RL-trained policies and their corresponding IL-trained policies.

| | N Input (kg/ha) | Water Input (L/m$^2$) | $N_t$ (kg/ha) | Yield (kg/ha) | RF 1 | RF 5 |
|---|---|---|---|---|---|---|
| Baseline Policy | 360 | 393.7 | 212.6 | 10771.5 | 984.4 | 337.6 |
| RL-Trained Policy 1 (Full) | 240 | 156 | 38.5 | 10998 | 1376.5 | N/A |
| IL-Trained Policy 1 (Partial) | 245.6 | 238.9 | 43.4 | 11279.8 | 1325.5 | N/A |
| IL-Trained Policy 1 (Partial, Round) | 240 | 210 | 41.4 | 11199.5 | 1348.9 | N/A |
| RL-Trained Policy 5 (Full) | 200 | 138 | 39.2 | 10926.1 | N/A | 1651 |
| IL-Trained Policy 5 (Partial) | 192.6 | 141.6 | 38.1 | 10944.2 | N/A | 1663.9 |
| IL-Trained Policy 5 (Partial, Round) | 200 | 144 | 40.8 | 10783.7 | N/A | 1608.6 |

VIII. COMBINED TRAINING WITH REINFORCEMENT LEARNING AND IMITATION LEARNING

Figure 3:
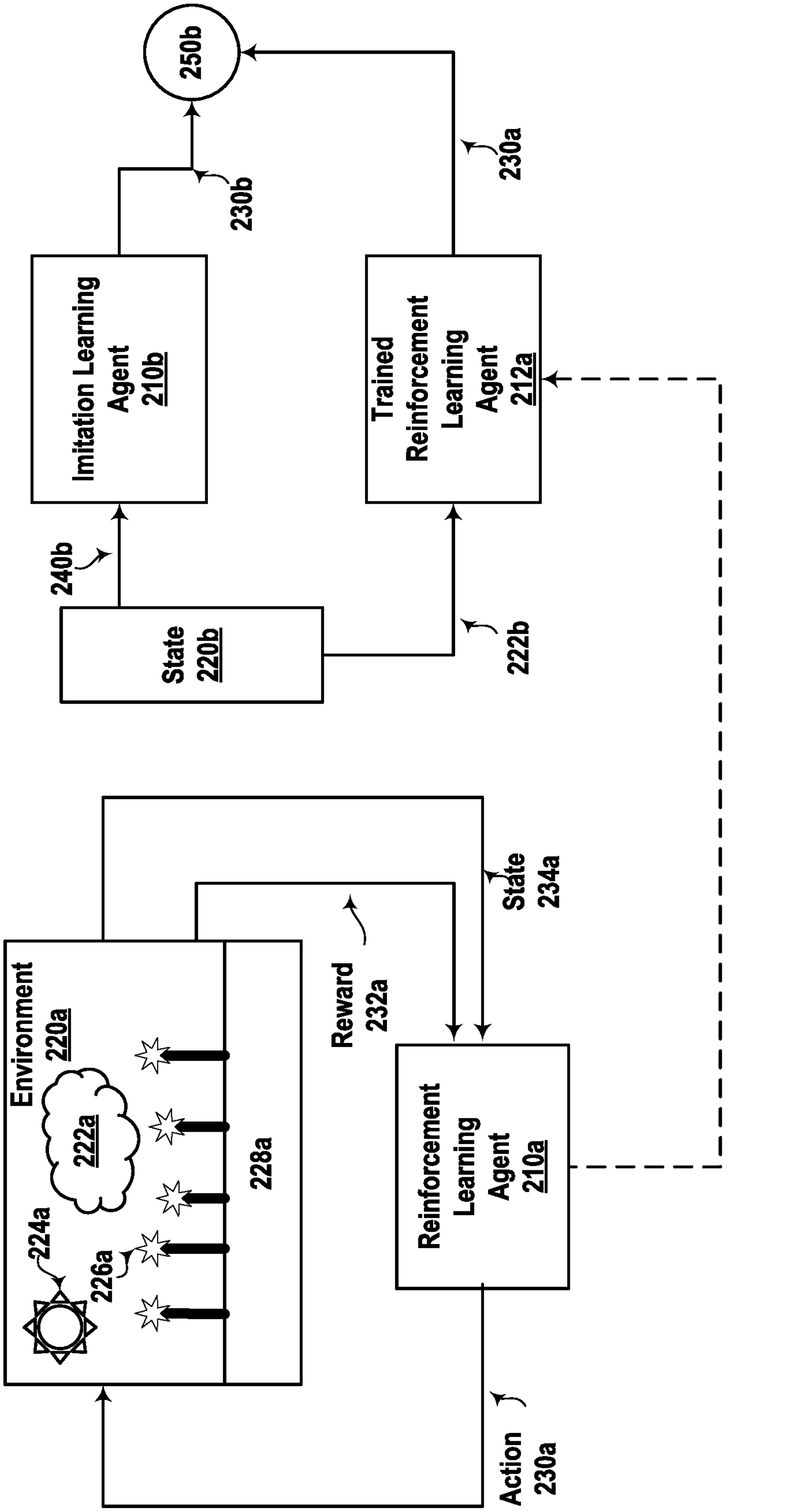
FIG. 3 illustrates a combined training process for intelligent agricultural management using reinforcement learning and imitation learning.

FIG. 3 illustrates a combined training process for intelligent agricultural management using reinforcement learning and imitation learning. The combined training process 300 may include a reinforcement learning agent 210*a* which is trained by a process analogous to the training process illustrated in FIG. 2B. The reinforcement learning agent 210*a* may be trained by this process to produce a trained reinforcement learning agent 212*a*, which is an expert agent. The expert agent 212*a* may then be used to train an imitation learning agent 210*b* in a process analogous to the process illustrated in FIG. 2B.

IX. POLICY TRAINING UNDER PARTIAL OBSERVATION WITH REINFORCEMENT LEARNING AND IMITATION LEARNING

During the policy training under full observation, some example embodiments include all the states from DSSAT as the input to the RL agent. However, most of the states available in DSSAT, including nitrate leaching and daily nitrogen denitrification, cannot be obtained or even measured by farmers with existing instruments in reality. As a result, there is no way to implement those trained policies on a real agricultural operation, and a policy that only utilizes state information that can be easily obtained or measured (partial observation) by farmers is necessary for field tests. As illustrated in FIG. 3, the policy is trained under partial observation with both RL and IL. The training methods used in FIG. 3 are not limiting, and other training or predictive modeling methods may be used. In IL, the RL-trained policies under full observation were used as experts to train new policies.

X. EXAMPLE EXPERIMENTS AND RESULTS

Experiments on the training of N and irrigation management policies for the maize crop in 1982 Florida were conducted under both full observation and partial observation to validate the feasibility and benefit of the proposed framework. We used DQN to train management policies under full observation, and the trained policies are then used as the experts to train management policies under partial observation using IL. We tested the performance of all the trained policies in simulation and compared the results with that of a baseline policy following a corn production guide for farmers in Florida.

XI. EXAMPLE METHODS

The present disclosure provides example methods of training and using a model for intelligent agricultural management, in accordance with example embodiments.

Figure 4:
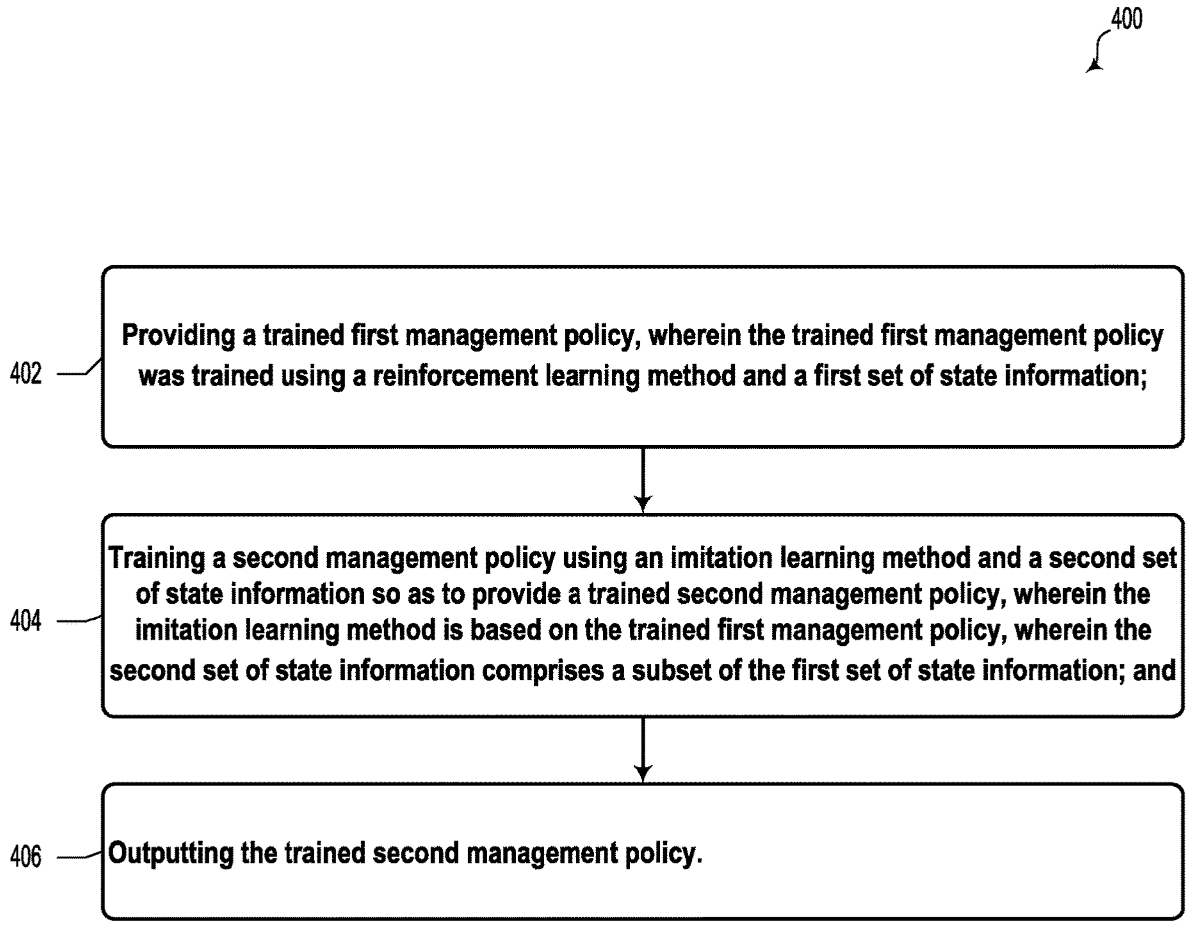
FIG. 4 is a flowchart depicting a method of training a model to produce an agricultural management policy, in accordance with example embodiments.

FIG. 4 is a flowchart depicting a method 400 of training a model to produce an agricultural management policy, in accordance with example embodiments. Method 400 can be executed by a computing device, such as computing device 100. Method 400 can begin at block 402, wherein the method 400 involves providing, by the computing device 100, a trained first management policy, wherein the trained first management policy was trained using a reinforcement learning method and a first set of state information. In some embodiments, providing the trained first management policy could include, for example, transmitting the trained first management policy to another computing device (e.g., a mobile device, a cloud server, or a remote client).

At block 404, the method 400 involves training, by the computing device 100 a second management policy using an imitation learning method and a second set of state information so as to provide a trained second management policy, wherein the imitation learning method is based on the trained first management policy, wherein the second set of state information comprises a subset of the first set of state information. In some embodiments, the second set of state information may be a proper subset of the first set of state information. In some embodiments, the training may be performed by another computing device (e.g., a mobile device, a cloud server, or a remote client).

At block 406, the method involves outputting, by the computing device 100, the trained second management policy. In some embodiments, outputting the trained second management policy could include, for example, transmitting the trained second management policy to another computing device (e.g., a mobile device, a cloud server, or a remote client).

Figure 5:
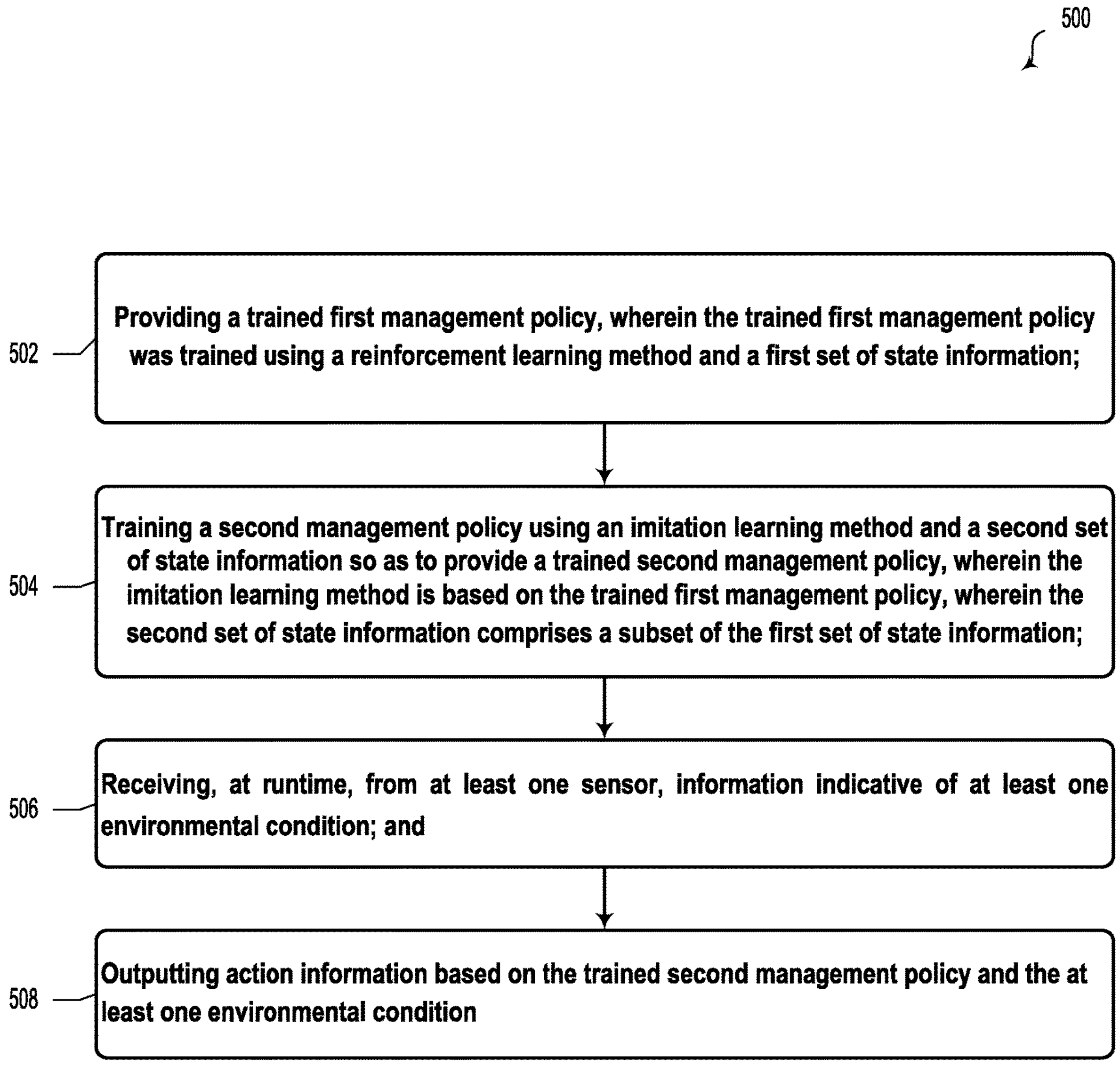
FIG. 5 is a flowchart depicting a method of training a model to recommend actions based on an agricultural management policy, in accordance with example embodiments.

FIG. 5 is a flowchart depicting a method 500 of training a model to recommend actions based on an agricultural management policy, in accordance with example embodiments. Method 500 can be executed by a computing device, such as computing device 100. Method 500 can begin at block 502, wherein the method involves providing, by the computing device 100, a trained first management policy, wherein the trained first management policy was trained using a reinforcement learning method and a first set of state information. In some embodiments, providing the trained first management policy could include, for example, transmitting the trained first management policy to another computing device (e.g., a mobile device, a cloud server, or a remote client).

At block 504, the method 500 involves training, by the computing device 100 a second management policy using an imitation learning method and a second set of state information so as to provide a trained second management policy, wherein the imitation learning method is based on the trained first management policy, wherein the second set of state information comprises a subset of the first set of state information. In some embodiments, the second set of state information may be a proper subset of the first set of state information. In some embodiments, the training may be performed by another computing device (e.g., a mobile device, a cloud server, or a remote client).

At block 506, the method 500 involves receiving, at runtime, from at least one sensor (e.g., sensor devices 120) of the computing device 100, information indicative of at least one environmental condition. In some embodiments, outputting the trained second management policy could include, for example, transmitting the trained second management policy to another computing device (e.g., a mobile device, a cloud server, or a remote client).

At block 508, the method 500 involves outputting, by the computing device 100, action information based on the trained second management policy and the at least one environmental condition. In some embodiments, outputting the action information could include, for example, transmitting the action information to another computing device (e.g., a mobile device, a cloud server, or a remote client). In some embodiments, outputting the action information could include, for example, transmitting the action information to one or more automated systems configured to carry out the actions (e.g., a remote-controlled tractor, an irrigation system, or a livestock feed facility).

XII. CONCLUSION

Finding the optimal crop management policy for N fertilization and irrigation is vital to achieving maximum yield while minimizing the management cost and environmental impact. Embodiments of the present disclosure include a system and method for finding the optimal management policy with deep reinforcement learning (RL), imitation learning (IL), and crop simulations (such crop simulations may, e.g., be based on DSSAT). Experiments are conducted for the maize crop in Florida, where both fertilization and irrigation are necessary for crop growth. Under full observation, i.e. with access to all variables from the simulator, deep Q-network (DQN), a deep RL algorithm, is used to train management policies. Under partial observation, i.e., with access to a limited number of states from DSSAT that are observable or measurable in the real world, imitation learning is used to train management policies by mimicking the behaviors of the RL-trained policies under full observation. Given variations in potential reward functions, the trained policies from RL have different strategies during the decision-making to achieve maximum rewards. This shows that the system and method adapt to different scenarios. Also, all trained policies under both full and partial observation achieve better results compared to a production guideline for the maize crop in Florida. Furthermore, the trained policies under partial observation pave the way for real world deployment of the system and method as they only need readily accessible information.

The present invention has been described in connection with what are presently considered to be the most practical and preferred embodiments. However, the invention has been presented by way of illustration and is not intended to be limited to the disclosed embodiments. Accordingly, one of skill in the art will realize that the invention is intended to encompass all modifications and alternative arrangements within the scope of the invention as set forth in the appended claims.

The invention claimed is:

1. A method of using imitation learning to apply an amount of nitrogen (N) input to crops, comprising:

training a second management policy based on an imitation learning method and a second set of state information to provide a trained second management policy, wherein the imitation learning method is based on a trained first management policy, wherein the trained first management policy was trained using a reinforcement learning method and a first set of state information, wherein the second set of state information comprises a subset of the first set of state information;

receiving, at runtime, from at least one sensor, information indicative of at least one environmental condition;

determining the amount of N input using the trained second management policy and the at least one environmental condition, wherein the amount of N input optimizes crop yield action and reduces environmental impact; and transmitting, to an automated system, the amount of N input, wherein transmitting the amount of N input causes the automated system to apply the amount of N input.

2. The method of claim 1, wherein the at least one environmental condition comprises at least one of weather information, plant information, animal information, soil information, pest information, or information collected by a camera.

3. The method of claim 1, wherein the first set of state information comprises information indicative of at least one of: cumulative nitrogen fertilizer applications (kg/ha), days after simulation started, growing degree days for current day (C/d), maize growing state, vegetative growth state (may include number of leaves), plant population density (plant/$m^2$), rainfalls for the current day (mm/d), solar radiations during the current day ($MJ/m^2/d$), maximum temperature for current day (C), minimum temperature for current day (C), index of plant nitrogen stress, massic fraction of nitrogen in grains, index of plant water stress, daily nitrate leaching (kg/ha), cumulative nitrogen denitrification (kg/ha), daily nitrogen denitrification (kg/ha), daily nitrogen plant population uptake (kg/ha), cumulative plant population nitrogen uptake (kg/ha), plant population leaf area index ($m^2$_leaf/$m^2$ soil), top weigh (kg/ha), actual soil evaporation rate (mm/d), calculated runoff (mm/d), depth to water table (cm), root depth (cm), cumulative ammonia volatilization (kgN/ha), or volumetric soil water content in soil layers ($cm^2$ [water]/$cm^2$ [soil]).

4. The method of claim 1, wherein the trained first management policy is a baseline management policy.

5. The method of claim 1, further comprising training a first management policy based on deep neural network or a deep Q-network (DQN) so as to provide the trained first management policy.

6. The method of claim 5, wherein the reinforcement learning method is based on a crop simulation.

7. The method of claim 5, wherein the reinforcement learning method is based on a real-world agricultural operation.

8. The method of claim 5, wherein the first management policy is trained based on information indicative of at least one environmental condition, wherein the at least one environmental condition is obtained from one or more sensors.

9. The method of claim 1, wherein training the second management policy comprises collecting one or more state action pairs from the trained first management policy and updating the second management policy by minimizing a loss function representing a difference between an output of the second management policy with the second set of state information as an input and an action determined by the trained first management policy given the second set of state information.

10. The method of claim 9, wherein the output of the second management policy represents at least one of information indicative of economic profit and environmental impact of the second management policy.

11. A system of using imitation learning to apply an amount of nitrogen (N) input to crops, comprising:

one or more sensors configured to collect information indicative of at least one environmental condition;

a controller having at least one processor and a memory configured to store program instructions, wherein the processor is operable to execute the program instructions to carry out operations, the operations comprising:

training, by the controller, a second management policy based on an imitation learning method and a second set of state information to provide a trained second management policy, wherein the imitation learning method is based on a trained first management policy, wherein the trained first management policy was trained using a reinforcement learning method and a first set of state information, wherein the second set of state information comprises a subset of the first set of state information;

receiving, at runtime, from the one or more sensors, information indicative of at least one environmental condition;

determining the amount of N input using the trained second management policy and the at least one environmental condition, wherein the amount of N input optimizes crop yield action and reduces environmental impact; and transmitting, to an automated system, the amount of N input, wherein transmitting the amount of N input causes the automated system to apply the amount of N input.

12. The system of claim 11, wherein the at least one environmental condition comprises at least one of weather information, plant information, soil information, pest information, or information collected by a camera.

13. The system of claim 11, wherein the first set of state information comprises information indicative of at least one of: cumulative nitrogen fertilizer applications (kg/ha), days after simulation started, growing degree days for current day (C/d), maize growing state, vegetative growth state (may include number of leaves), plant population density (plant/$m^2$), rainfalls for the current day (mm/d), solar radiations during the current day ($MJ/m^2/d$), maximum temperature for current day (C), minimum temperature for current day (C), index of plant nitrogen stress, massic fraction of nitrogen in grains, index of plant water stress, daily nitrate leaching (kg/ha), cumulative nitrogen denitrification (kg/ha), daily nitrogen denitrification (kg/ha), daily nitrogen plant population uptake (kg/ha), cumulative plant population nitrogen uptake (kg/ha), plant population leaf area index ($m^2$_leaf/$m^2$_soil), top weigh (kg/ha), actual soil evaporation rate (mm/d), calculated runoff (mm/d), depth to water table (cm), root depth (cm), cumulative ammonia volatilization (kgN/ha), or volumetric soil water content in soil layers ($cm^2$ [water]/$cm^2$ [soil]).

14. The system of claim 11, further comprising training a first management policy based on deep neural network or a deep Q-network (DQN) so as to provide the trained first management policy.

15. The system of claim 14, wherein the reinforcement learning method is based on a crop simulation.

16. The system of claim 14, wherein the reinforcement learning method is based on a real-world agricultural operation.

17. The system of claim 14, wherein the first management policy is trained based on information indicative of at least one environmental condition, wherein the at least one environmental condition is obtained from one or more sensors.

18. A non-transitory computer-readable medium having stored thereon instructions that, when executed by a computing device, cause the computing device to:

train a second management policy based on an imitation learning method and a second set of state information to provide a trained second management policy, wherein the imitation learning method is based on a trained first management policy, wherein the trained first management policy was trained using a reinforcement learning method and a first set of state information, wherein the second set of state information comprises a subset of the first set of state information;

receive, at runtime, from at least one sensor, information indicative of at least one environmental condition;

determine the amount of N input using the trained second management policy and the at least one environmental condition, wherein the amount of N input optimizes crop yield action and reduces environmental impact; and transmit, to an automated system, the amount of N input, wherein transmitting the amount of N input causes the automated system to apply the amount of N input.

* * * * *